United States Patent
Freytag et al.

(10) Patent No.: US 6,738,755 B1
(45) Date of Patent: May 18, 2004

(54) QUERY OPTIMIZATION METHOD FOR INCREMENTALLY ESTIMATING THE CARDINALITY OF A DERIVED RELATION WHEN STATISTICALLY CORRELATED PREDICATES ARE APPLIED

(75) Inventors: Johann Christoph Freytag, Kleinmachnow (DE); Guy Maring Lohman, San Jose, CA (US); David E. Simmen, San Jose, CA (US); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,446

(22) Filed: Feb. 29, 2000

Related U.S. Application Data

(60) Provisional application No. 60/134,789, filed on May 19, 1999.

(51) Int. Cl.[7] ............................................. G06F 17/30
(52) U.S. Cl. ................. 707/2; 707/4; 707/5; 707/100
(58) Field of Search ............................... 707/1, 2, 3, 4, 707/100

(56) References Cited

U.S. PATENT DOCUMENTS

| | | | |
|---|---|---|---|
| 4,956,774 A | | 9/1990 | Shibamiya ............... 364/200 |
| 5,469,568 A | | 11/1995 | Schiefer et al. ........... 395/600 |
| 5,546,576 A | | 8/1996 | Cochrane et al. .......... 395/600 |
| 5,548,754 A | | 8/1996 | Pirahesh et al. ........... 395/600 |
| 5,548,758 A | | 8/1996 | Pirahesh et al. ........... 395/600 |
| 5,608,904 A | * | 3/1997 | Chaudhuri et al. ............ 707/2 |
| 5,615,361 A | | 3/1997 | Leung et al. ............... 395/282 |
| 5,664,171 A | | 9/1997 | Agrawal et al. ............ 395/602 |
| 5,761,652 A | | 6/1998 | Wu et al. ...................... 707/2 |
| 5,761,653 A | * | 6/1998 | Schiefer et al. ............... 707/2 |
| 5,864,841 A | | 1/1999 | Agrawal et al. ............... 707/1 |
| 5,875,445 A | * | 2/1999 | Antonshenkov ............... 707/1 |
| 5,899,986 A | * | 5/1999 | Ziauddin ....................... 707/2 |
| 5,995,957 A | * | 11/1999 | Beavin et al. ................. 707/2 |
| 6,012,054 A | * | 1/2000 | Seputis ......................... 707/3 |
| 6,138,111 A | * | 10/2000 | Krishna ........................ 707/2 |
| 6,263,345 B1 | * | 7/2001 | Farrar et al. ............. 707/104.1 |
| 6,272,487 B1 | * | 8/2001 | Beavin et al. ................. 707/2 |
| 6,289,334 B1 | * | 9/2001 | Reiner et al. ................ 707/10 |
| 6,341,281 B1 | * | 1/2002 | MacNicol et al. ............. 707/2 |
| 6,353,826 B1 | * | 3/2002 | Seputis ......................... 707/5 |
| 6,363,371 B1 | * | 3/2002 | Chaudhuri et al. ............ 707/2 |

OTHER PUBLICATIONS

Selinger et al. "Access Path Selection in a Relational Database Management System". 1979 ACM SIGMOD Intl. Conf. on the Management of Data. pp. 23–34.*

Wang et al. "Selectivity Estimation in the Presence of Alphanumeric Correlations". Duke University. 1997. pp. 1–12.*

(List continued on next page.)

*Primary Examiner*—John Breene
*Assistant Examiner*—Khanh Pham
(74) *Attorney, Agent, or Firm*—Gates & Cooper LLP

(57) ABSTRACT

A method, apparatus, and article of manufacture for incrementally estimating the cardinality of a derived relation when statistically correlated predicates are applied. A plurality of query execution plans (QEPs) are generated for the query. During the generation of the QEPs, a cardinality is computed for any of the QEPs in which two or more predicates are correlated to each other. The cardinality comprises a number of rows expected to be returned by the QEP and is computed in an incremental fashion for each operator of the QEP. The computations include calculations that may be done prior to the generation of the QEPs and calculations that are necessarily done as each operator of a QEP is added to that QEP. Thereafter, one of the QEPs is chosen to satisfy the query in a manner that minimizes an estimated cost metric, wherein the cost metric is computed using the cardinality.

66 Claims, 9 Drawing Sheets

OTHER PUBLICATIONS

Surajit Chaudhuri. "An Overview of Query Optimization in Relational Systems". Mar. 1998. ACM. pp. 34–43.*

Min Wang, Jeffrey Scott Vitter,and Bala Iyer. "Selectivity Estimation in the Presence of Alphanumeric Correlations". 1997. IEEE. pp. 169–180.*

Banchong Harangsri, John Shepherd, and Anne Ngu. "Selectivity Estimation for Joins Using Systematic Sampling". 1997. IEEE. pp. 384–389.*

A. Kemper, G. Moerkotte, K. Peithner, and M. Steinbrunn. "Optimizing Disjunctive Queries with Expensive Predicates". SIGMOD 94. May 1994. ACM. pp. 336–347.*

IBM Research Disclosure, "Filter Factor Estimation for Non–numeric Datatypes" Document No. 41575, Nov. 1998, pp 1505–1507.

IBM Technical Data Bulletin, "Handling the Nulls Generated by Extended Relational Operations", vol. 34, No. 4A, Sep. 1991, pp. 331–339.

IBM Technical Data Bulletin, "Integrated Buffer Management and Query Optimization Strategy for Relational Databases", vol. 32, No. 12, May 1990, pp. 253–257.

Jin Deog Kim et al., "Estimation Methods of Selectivity for Spatial Query Optimization", Journal of KISS (B), (Software and Applications), vol. 25, No. 7, pp. 980–995, Jul. 1998, (1–page Abstract).

Wan Sup Cho et al., "Selectivity Estimation for Nested Predicates in Object–oriented Databases", Journal of KISS (B), (Software and Applications), vol. 23, No. 8, pp. 787–799, Aug. 1996, (1–page Abstract).

P. Krishnan et al., "Estimating Alphanumeric Selectivity in the Presence of Wildcards", SIGMOD Record, vol. 25, No. 2, pp. 282–293, Jun. 1996, (1–page Abstract).

S. Chadhuri et al., "Optimizing Queries with Aggregate Views", Advances in Database Technology–EDBT '96. 5$^{th}$ International Conference on Extending Database Technology. Proceedings, Published: Berlin, Germany, 1996, 167–182, (1–page Abstract).

M. Muralikrishna, "Improved Unnesting Algorithms for Join Aggregate SQL Queries", Very Large Data Bases. VLDB 92. Proceedings of the 18$^{th}$ International Conference on Very Large Data Bases, pp. 91–102, Published: San Mateo, California, USA, 1992, (1–page Abstract).

M. V. Mannino et al., "Statistical Profile Estimation in Database Systems", Computing Surveys, vol. 20, No. 3, pp 191–221, Sep. 1988, (1–page Abstract).

P. Griffiths Selinger, M.M. Astrahan, D.D. Chamberlin, R.A. Lorie, and T.G. Price, "Access Path Selection in a Relational Database Management System", Procs. 1979 ACM SIGMOD Conf. (May 1979), pp. 23–34.

Rafiul Ahad, K.V. Bapa Rao, and Dennis McLeod, "On Estimating the Cardinality of the Projection of a Database Relation", ACM Transactions on Databases, vol. 14, No. 1 (Mar. 1989), pp. 28–40.

Allen Van Gelder, "Multiple Join Size Estimation by Virtual Domains" (extended abstract), Procs. of ACM PODS Conference, Washington, D.C.(May 1993), pp. 180–189.

Viswanath Poosala and Yannis E. Ioannidis, "Selectivity Estimation Without the Attribute Value Independence Assumption", Proc. of the 23rd Conference on Very Large Data Bases, Athens, Greece (1997), pp. 486–495.

B. Muthuswamy and Larry Kerschberg, "A Detailed Statistical Model for Relational Query Optimization", Procs. of the ACM Annual Conference, Denver (Oct. 1985), pp. 439–448.

David Simmen, Eugene Shekita, and Timothy Malkemus, "Fundamental Techniques for Order Optimization", Procs. 1996 ACM SIGMOD Conf. (May 1996), pp. 57–67.

* cited by examiner

O_ORDERDATE

O_CUSTKEY = 'ABC',
O_ORDERDATE
BETWEEN
10/1/97 AND 12/31/97

QUERY OPTIMIZATION METHOD FOR INCREMENTALLY ESTIMATING THE CARDINALITY OF A DERIVED RELATION WHEN STATISTICALLY CORRELATED PREDICATES ARE APPLIED

CROSS-REFERENCE TO RELATED APPLICATIONS

This application claims the benefit under 35 U.S.C §119 (e) of and commonly-assigned U.S. provisional application serial No. 60/134,789, entitled "QUERY OPTIMIZATION METHOD FOR INCREMENTALLY ESTIMATING THE CARDINALITY OF A DERIVED RELATION WHEN STATISTICALLY CORRELATED PREDICATES ARE APPLIED", filed on May 19, 1999, by Johann C. Freytag, Guy M. Lohman, David E. Simmen, and Calisto P. Zuzarte, which application is incorporated by reference herein.

BACKGROUND OF THE INVENTION

1. Field of the Invention

This invention relates in general to database management systems performed by computers, and in particular, to the optimization of queries using incremental estimates of cardinality for derived relations when statistically correlated predicates are applied.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American National Standards Institute (ANSI) and the International Standards Organization (ISO).

A query optimizer function in the RDBMS is responsible for translating SQL statements into an efficient query execution plan (QEP). The QEP dictates the methods and sequence used for accessing tables, the methods used to join these tables, the placement of sorts, where predicates are applied, and so on. The QEP is interpreted by the RDBMS when the query is subsequently executed.

There may be a large number of feasible QEPs, even for a simple query. The optimizer determines the best of these alternatives by modeling the execution characteristics of each one and choosing the QEP that minimizes some optimization goal such as response time or use of system resources. See, e.g., P. Griffiths Selinger, M. M. Astrahan, D. D. Chamberlin, R. A. Lorie, and T. G. Price, "Access Path Selection in a Relational Database Management System", Procs. 1979 ACM SIGMOD Conf. (May 1979), pp. 23–34, incorporated by reference herein, (hereinafter referred to as [Selinger 79]).

The optimizer may choose to minimize some estimated cost metric, such as resource consumption or elapsed time, wherein the most important factor in accurately computing any cost used during optimization is a cardinality estimate. The pioneering work in estimating the cardinality of a plan in an incremental fashion was described in [Selinger 79]. However, this work assumed that each predicate was independent and that values were distributed uniformly.

U.S. Pat. No. 4,956,774, issued September 1990 to Akira Shibamiya and R. Zimowski, entitled "Data base optimizer using most frequency values statistics", incorporated by reference herein, (hereinafter referred to as [Shibamiya 90]), kept frequency statistics to drop the assumption of uniformity, but did not deal with the independence assumption.

U.S. Pat. No. 5,469,568, issued Nov. 21, 1995, to K. Bernhard Schiefer and Arun Swani, entitled "Method for choosing largest selectivities among eligible predicates of join equivalence classes for query optimization", incorporated by reference herein, (hereinafter referred to [Schiefer 95]), derived a technique for computing cardinalities of joins only when the join (i.e., multi-table) predicates were completely redundant, i.e., implied by other predicates given by the user, but did not deal with local (i.e., single-table) predicates and predicates whose correlation are somewhere between completely redundant and completely independent.

Rafiul Ahad, K. V. Bapa Rao, and Dennis McLeod, "On Estimating the Cardinality of the Projection of a Database Relation", ACM Transactions on Databases, Vol. 14, No. 1 (March 1989), pp. 28–40, incorporated by reference herein, (hereinafter referred to as [ARM 89]), exploited multi-variate distributions of the values in the database and semantic constraints to estimate the size of a query when correlations can occur, but only for a single table having no duplicate rows (which SQL allows).

Allen Van Gelder, "Multiple Join Size Estimation by Virtual Domains" (extended abstract), Procs. of ACM PODS Conference, Washington, D.C. (May 1993), pp. 180–189, incorporated by reference herein, (hereinafter referred to as [VG 93]), adjusted the selectivity of individual predicates based upon correlation statistics, so that the state-of-the-art techniques can be used unchanged. However, such adjustments under-estimate the cardinality for the partial QEPs applying some proper subset of such correlated predicates.

Viswanath Poosala and Yannis E. Ioannidis, "Selectivity Estimation Without the Attribute Value Independence Assumption", Proc. of the 23rd Conference on Very Large Data Bases, Athens, Greece (1997), pp. 486–495, incorporated by reference herein, (hereinafter referred to as [PI 97]), also exploited multi-variate distributions on two columns only, summarized as 2-dimensional histograms that are further compressed using singular-value decomposition, but does not deal with equality predicates (the most common form of predicates, especially for joins) or correlations among more than two predicates.

Other references of interest include: B. Muthuswamy and Larry Kerschberg, "A Detailed Statistical Model for Relational Query Optimization", Procs. of the ACM Annual Conference, Denver (October 1985), pp. 439–448, incorporated by reference herein, (hereinafter referred to as MK 85); and David Simmen, Eugene Shekita, and Timothy Malkemus, "Fundamental Techniques for Order Optimization", Procs. 1996 ACM SIGMOD Conf. (May 1996), pp. 57–67, incorporated by reference herein, (hereinafter referred to as [Simmen 96]).

Notwithstanding these various prior art methods, there exists a need in the art for improved techniques for optimizing queries, especially through the use of estimated cardinality.

SUMMARY OF THE INVENTION

To overcome the limitations in the prior art described above, and to overcome other limitations that will become apparent upon reading and understanding the present specification, the present invention discloses a method, apparatus, and article of manufacture for incrementally estimating the cardinality of a derived relation when statistically correlated predicates are applied. A plurality of query execution plans (QEPs) are generated for the query. During the generation of the QEPs, a cardinality is computed for any of the QEPs in which two or more predicates are correlated to each other. The cardinality comprises a number of rows expected to be returned by the QEP and is computed in an incremental fashion for each operator of the QEP. The computations include calculations that may be done prior to the generation of the QEPs and calculations that are necessarily done as each operator of a QEP is added to that QEP. Thereafter, one of the QEPs is chosen to satisfy the query in a manner that minimizes an estimated cost metric, wherein the cost metric is computed using the cardinality.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

HARDWARE AND SOFTWARE ENVIRONMENT

Figure 1:
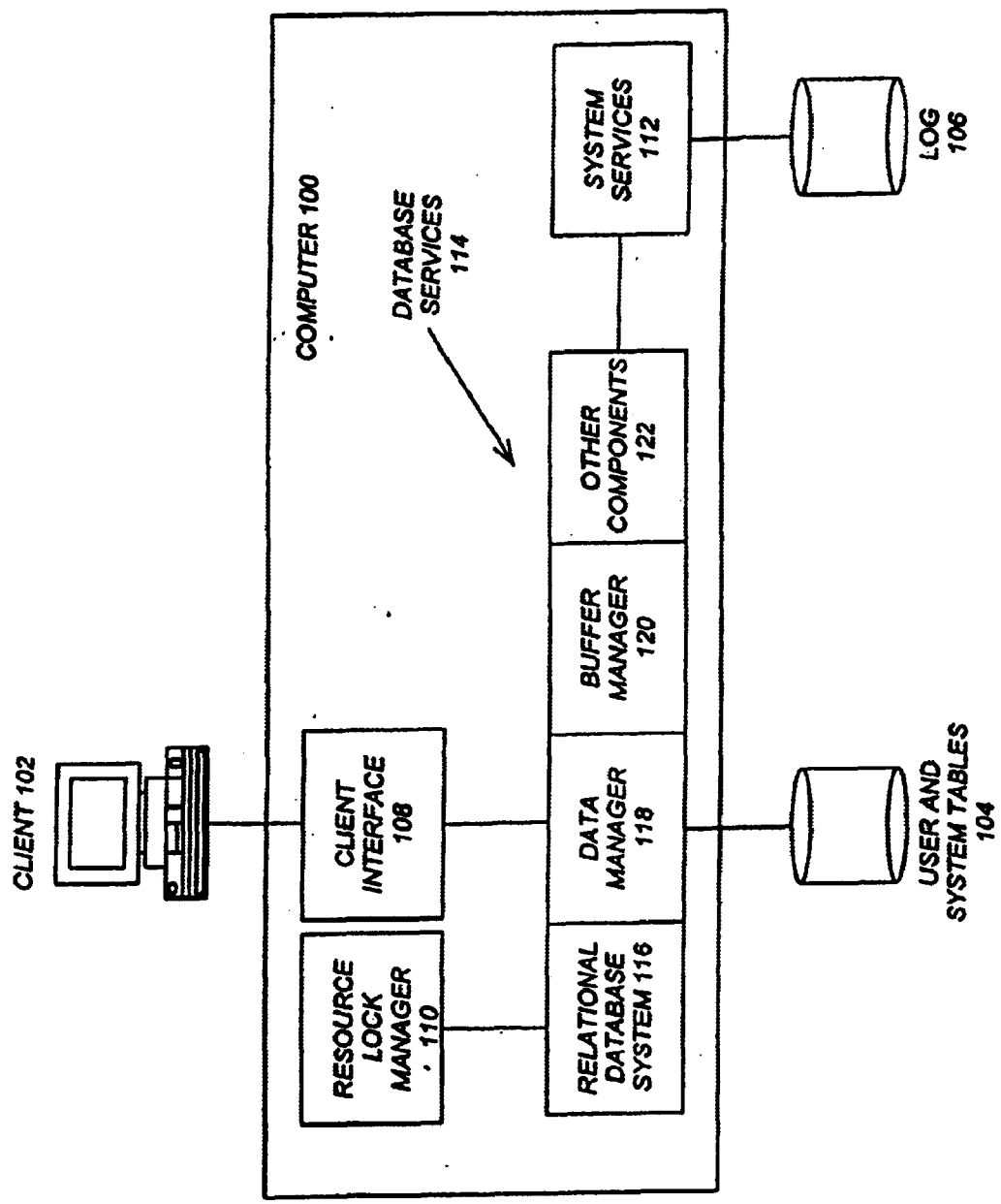
FIG. 1 illustrates the computer hardware environment of the present invention.

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) that manages user and system tables 104 and includes a system log 106. In the preferred embodiment of the present invention, the RDBMS comprises the DataBase 2 (DB2™) Universal DataBase (UDB™) product offered by IBM Corporation, although those skilled in the art will recognize that the present invention has application to any RDBMS. The client computers 102 interface to the RDBMS via a client interface component 108.

As illustrated in FIG. 1, the RDBMS includes three major components: the Resource Lock Manager (RLM) 110, the Systems Services module 112, and the Database Services module 114. The RLM) 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS is the Database Services module 114. The Database Services module 114 contains several submodules, including a Relational Database System (RDS) 116, Data Manager 118, Buffer Manager 120, and Other Components 122 such as an SQL compiler/interpreter. These submodules support the functions of the SQL language, i.e., definition, access control, retrieval, and update.

Generally, the RDBMS comprises logic and/or data that is embodied in or retrievable from a device, medium, or carrier, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, carrier, or media.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

Interactive SQL Execution

Figure 2:
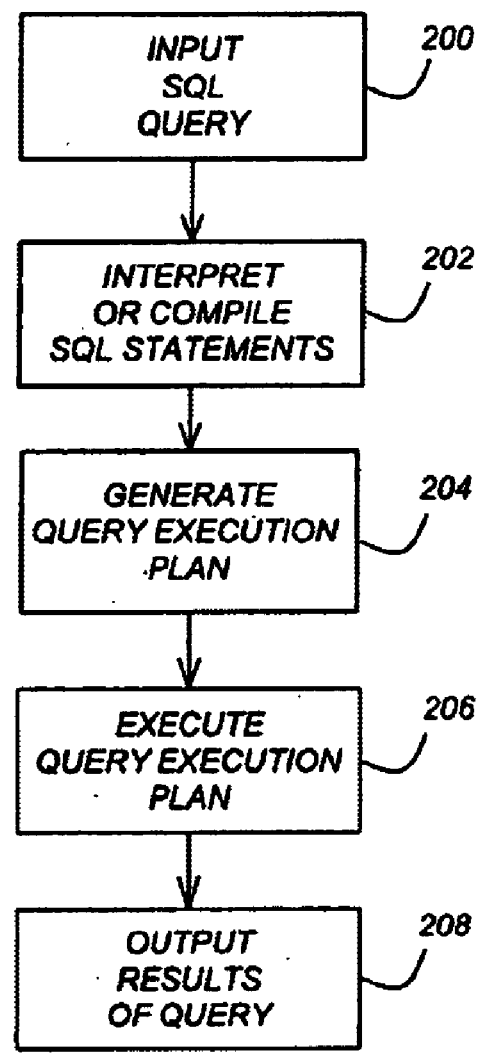
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 200 represents the input of SQL statements into the computer system 102. Block 202 represents the step of compiling or interpreting the SQL statements. Block 204 represents the step of generating a compiled set of runtime structures called a query execution plan from the compiled SQL statements. An optimization function at Block 204 may transform or optimize the SQL query in a manner described in more detail later in this specification. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 206 represents the execution of the query execution plan and Block 208 represents the output of the results.

Embedded/Batch SQL Execution

Figure 3:
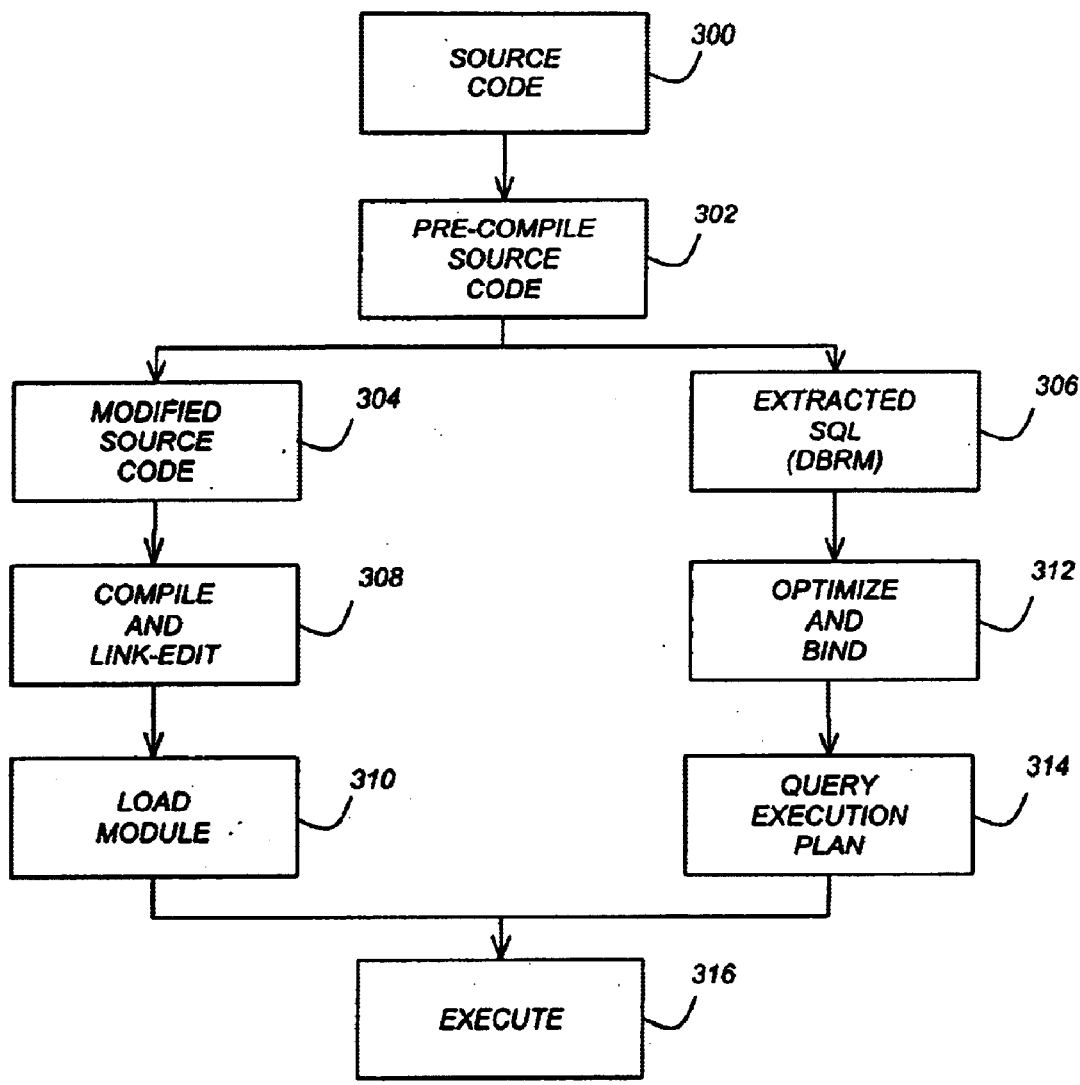
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 300 represents program source code containing a host language (such as COBOL or C) and embedded SQL statements. The program source code 300 is then input to a pre-compile step 302. There are two outputs from the pre-compile step 302: a modified source code module 304 and a Database Request Module (DBRM) 306. The modified source code module 304 contains host language calls to the RDBMS, which the pre-compile step 302 inserts in place of SQL statements. The DBRM 306 is comprised of the SQL statements from the program source code 300. A compile and link-edit step 308 uses the modified source code module 304 to produce a load module 310, while an optimize and bind step 312 uses the DBRM 306 to produce a compiled set of runtime structures for the query execution plan 314. As indicated above in conjunction with FIG. 2, the SQL statements from the program source code 300 specify only the desired data, but not how to retrieve the data. The optimize and bind step 312 may optimize the SQL query in a manner described in more detail later in this specification. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient access path for the query. The load module 310 and query execution plan 314 are then executed together at step 316.

Description of the Optimization Technique

The present invention discloses an improved optimization technique that is typically performed at step 204 of FIG. 2 or step 312 of FIG. 3. Specifically, the present invention discloses an improved optimization technique using incremental estimates of cardinality for derived relations when statistically correlated predicates are applied.

Incremental Application of a Search Condition

One of the most important factors in determining the execution characteristics of a QEP operation, and hence a QEP, is the number of records on which it operates, i.e., its cardinality. Some QEP operations apply predicates, thus reducing the number of records seen by subsequent operations.

Consider the following query definition for Table 1, which shows a query asking for the orders for one customer for a given quarter.

TABLE 1

Figure 4:
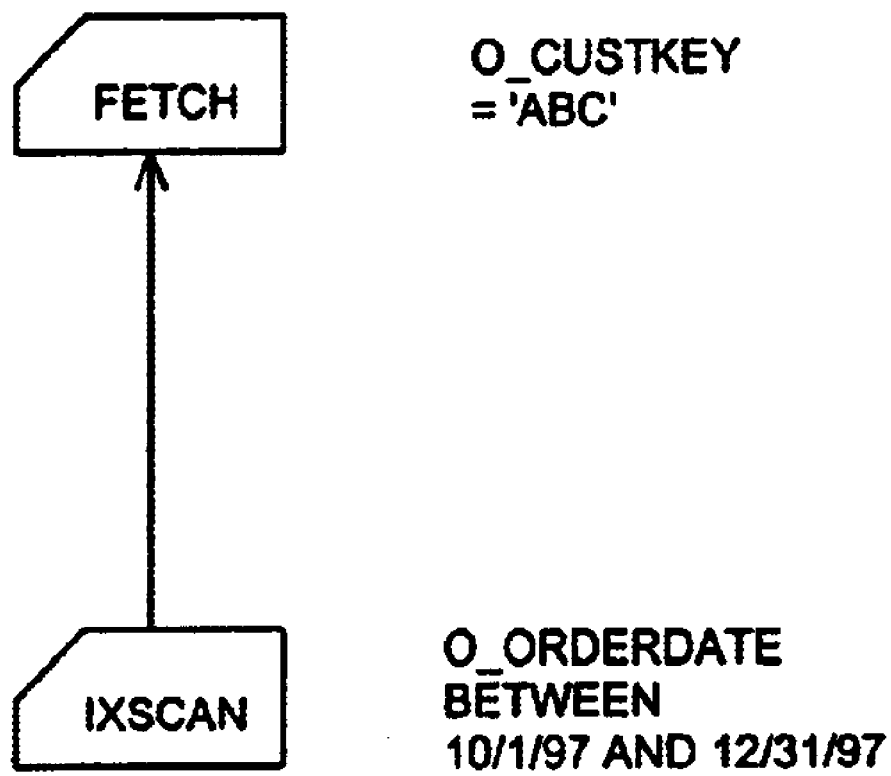
FIGS. 4 and 5 are data flow graphs illustrating query execution plans according to the preferred embodiment of the present invention.

SELECT*
FROM ORDERS
WHERE O_ORDERDATE BETWEEN '10/01/97' AND '12/31/97'
    AND O_CUSTKEY = 'ABC'
ORDER BY O_ORDERDATE;

FIG. 4 illustrates an alternative QEP, QEP "A", for this query, wherein QEP "A" uses the common data flow graph representation for a QEP, as described in Guy M. Lohman, "Grammar-like Functional Rules for Representing Query Optimization Alternatives", Procs. of 1988 ACM SIGMOD Conf. (May 1988), pp. 18–27, incorporated by reference herein, (hereinafter referred to as [Lohman 88]).

This QEP represents a typical index access to the orders table. An index on the O_ORDERDATE column is used to directly access the records qualified by the predicate O_ORDERDATE between 'Oct. 1, 1997' and 'Dec. 31, 1997'. This is represented by the IXSCAN operation. The qualifying records are then retrieved from the orders relation by the FETCH operation which filters records further by evaluating the predicate O_CUSTKEY='ABC'.

This QEP illustrates the technique of incremental application of a search condition. The search condition is transformed into conjunctive normal form and each conjunct, or predicate, is applied independently. Since a predicate can be used to reject a row from further processing, it is usually applied as soon as it becomes eligible for application. A predicate becomes eligible as soon as all columns it references are available.

The search condition of query1 has two predicates, O_ORDERDATE between 'Oct. 1, 1997' and 'Dec. 31, 1997' and O_CUSTKEY='ABC'. The predicate O_ORDERDATE between 'Oct. 1, 1997' and 'Dec. 31, 1997' is eligible for the IXSCAN operation since the O_ORDERDATE column is stored in the index; however, the predicate O_CUSTKEY='ABC' is not eligible until the O_CUSTKEY column has been retrieved from the table by the FETCH operation.

Figure 5:
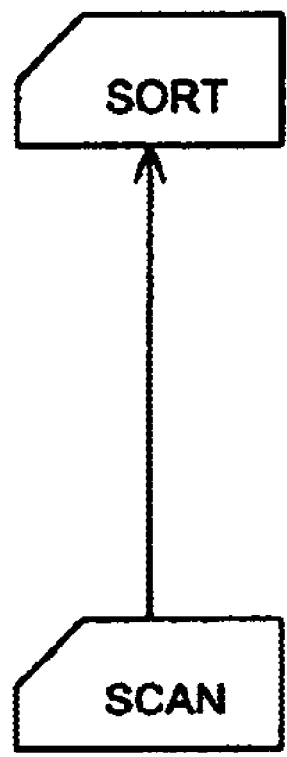

FIG. 5 shows another QEP, QEP "B", for the query, wherein QEP "B" simply scans the entire orders table, applies the predicates to each row, and sorts the result to satisfy the "order by" requirement. This QEP may be more efficient than the previous one if the index does little filtering while the number of rows to sort is small. Note that in QEP "B" both predicates become eligible simultaneously in the SCAN operator. Thus, the optimizer has the freedom to decide the order of their application. Since the predicate O_CUSTKEY='ABC' is more selective, it makes sense to apply this predicate first, thus avoiding the expense of applying the predicate O_ORDERDATE between 'Oct. 1, 1997' and 'Dec. 31, 1997' for the large percentage of rows that will not satisfy the predicate on O_CUSTKEY.

Incremental Cardinality Estimation With Statistically Independent Predicates

Since the execution characteristics of a QEP operation are heavily dependent upon the number of records on which it operates, it follows that one of the most important tasks of a query optimizer is the estimation of the number of rows after a predicate is applied. This process is referred to as cardinality estimation. Virtually all modern query optimizers base such cardinality estimates on the same probabilistic model that was used in the System R prototype, as described in [Selinger 79].

Each predicate in the query's WHERE clause is assigned a so-called "filter factor" or "selectivity", which effectively represents the probability that any row from the base table(s) will satisfy that predicate. The filter factors are typically derived from statistics about the database, such as the number of distinct values of the referenced column, i.e., the column cardinality, or more detailed statistics such as histograms [PI 97] or frequent values [Shibamiya 90]. Note that statistics typically are collected for individual columns only, not for combinations of columns, except when indexes have been created on multiple columns.

In order to simplify cardinality estimation, most query optimizers make the assumption that this filtering effect, or selectivity, of one predicate is (probabilistically) independent of the selectivity of another. In the example above, this means that a given company does not influence when orders are placed, and vice versa. Whether this assumption is valid or not is a characteristic of the semantics of the underlying columns, not the predicates. Under this assumption, the resulting cardinality is computed for any portion of a QEP by progressively multiplying the cardinality of the base table by the selectivity of each predicate as it is applied. Thus, cardinality estimation under this independence assumption can proceed incrementally, as each predicate is applied.

Incremental cardinality estimation under the independence assumption will be illustrated by again considering the QEP of FIG. 4. Assume that 100,000 orders have been collected for 20 quarters and that there are 100 known customers. Under a typical optimization assumption that column data is distributed uniformly (i.e., that orders are placed uniformly over time and each customer is equally likely to place an order), as described in [Selinger 79], the optimizer would assign a selectivity of $\frac{1}{20}$ to the predicate O_ORDERDATE between 'Oct. 1, 1997' and 'Dec. 31, 1997' and $\frac{1}{100}$ to the predicate O_CUSTKEY='ABC'. The optimizer would then estimate that the IXSCAN operation would produce 5,000 rows by multiplying the selectivity of the predicate O_ORDERDATE between 'Oct. 1, 1997' and 'Dec. 31, 1997' by the cardinality of the orders table (i.e., $\frac{1}{20}*100,000$). The optimizer would then estimate that the FETCH operation would further reduce these 5,000 rows to 50 rows by applying the selectivity of the predicate O_CUSTKEY='ABC' to the number of rows produced by its input operation, IXSCAN (i.e., $\frac{1}{100}*5,000$).

The technique of incremental cardinality estimation is efficient. Predicate selectivities can be computed once rather than each time the predicate is considered in an alternative QEP. Cardinality estimation involves simply reducing the previous estimate by the selectivity of a predicate as it is applied. Each operator need only track the cardinality estimate in progress. This cardinality estimation technique is easily extended for operations with multiple inputs. For example, the cardinality estimate for the UNION operation is simply the sum of the incremental cardinality estimates for all of its inputs. Moreover, [Schiefer 95] described techniques for incremental cardinality estimation when join operations are involved.

Statistically Correlated Predicates

Unfortunately, in practice, the selectivity of predicates may not be independent. Suppose that customer 'ABC' has a business building swimming pools, and that business is typically slow the last quarter of each year. Perhaps this customer only places 10% of its usual orders during this time. Thus, in reality, only about $\frac{1}{10}$ of the orders in the last quarter are from customer 'ABC'. Armed with this knowledge, the optimizer should determine that the FETCH operation of QEP "A" in Table 1 reduces the 5,000 input rows to only 500, rather than 50. Further, the SORT operation of QEP "B" in FIG. 5 will now have to sort $\frac{1}{10}*\frac{1}{20}*5000=25$ rows, rather than the original estimate of only 2.5 rows.

It is said that the selectivities of one or more predicates are statistically correlated, i.e., are not independent, if their combined selectivity is different from their selectivities when considered in isolation. Predicates on different columns can have varying degrees of correlation, and can have correlation with more than one other predicate.

For example, consider a table of different types of cars, each having a MAKE (i.e., manufacturer), MODEL, STYLE (e.g., sedan, SUV, station wagon, etc.), YEAR, and COLOR Predicates on COLOR are likely to be independent of those on MAKE, MODEL, STYLE, or YEAR, as most every manufacturer makes the same standard colors available for each of their models and styles, year after year. However, the predicates MAKE='Honda' and MODEL='Accord' certainly are not independent, since only Honda makes a model called 'Accord'. The correlation may be subtler than this rather obvious hierarchy of attributes. For example, a predicate STYLE='hatchback' is correlated to any predicates on YEAR; MAKE, and MODEL, since not every manufacturer or every MODEL had a hatchback STYLE (there was a Honda Accord hatchback, but never a Honda Civic hatchback, and Cadillac never made a hatchback) and Honda stopped making hatchbacks in the early 1990s about the time they started making SUVs.

Estimating Cardinality

The goal of the preferred embodiment of the present invention, then, is to accurately estimate the cardinality of a query containing multiple predicates that may be correlated, using the same efficient, incremental approach that is used for independent predicates.

An example of such a query is provided in Table 2 below, which is a query with multiple, correlated predicates:

TABLE 2

SELECT*
FROM CARS
WHERE MAKE = 'HONDA' AND
    MODEL = 'ACCORD' AND
    STYLE = 'HATCHBACK' AND
    YEAR = 1990;

The preferred embodiment of the present invention incrementally estimates the number of rows that satisfy any subset of predicates, whether those predicates are correlated or not, as each new operator applies additional predicates. The preferred embodiment of the present invention also determines the effect on the estimated cardinality of applying the predicates that can be applied by any operator, using only the subset of predicates that were applied prior to that operator, which subsets of those predicates that were correlated, and the estimated cardinality that resulted.

The preferred embodiment of the present invention provides a method for taking the cardinality that would have been estimated, assuming independence of all predicates, and adjusting that estimate to account for those newly applied predicates that were correlated. In doing so, it needs information as to the degree to which correlated predicates are correlated. This information can be provided by the user or derived from the underlying database, e.g., by examining statistics collected for the columns referenced in the predicates.

The preferred embodiment of the invention divides the work into two phases. The first pre-planning phase can be done prior to generation of alternative QEPs, whereas the second planning phase is done as alternative QEPs are generated.

Pre-planning Phase

In the first phase, called the pre-planning phase, the optimizer computes the selectivity of each predicate in the WHERE clause independently, as is done in the current state of the art. This can involve a variety of techniques and statistics on which those techniques apply. Additionally, the present invention requires also calculating an adjustment to these selectivities for those predicates which may be correlated to each other, using additional information.

For example, the adjustment factor can be computed from the number of combined distinct values occurring in the database for the columns referenced in any set of predicates which are correlated, i.e., those for which the independence assumption is invalid. This statistic may either: (1) already exist, due to the creation of an index and the collection of statistics on that index; (2) be provided by the user, or (3) be collected by or derived by some other mechanism, such as a daemon.

Suppose, for example, that two of the above predicates are:

P1: MAKE='Honda'

P2: MODEL='Accord'

Assuming for the moment that the distribution of the values for the columns MAKE and MODEL is uniform, and that there are C1 values of MAKE and C2 values of MODEL extant in the database, the selectivity S1 for P1 would be 1/C1 and the selectivity S2 for P2 would be 1/C2. If the independence assumption were valid, then the selectivity of P1 and P2 together would be computed, S12 as 1/C1*1/C2= 1/(C1*C2). Note that this is equivalent to assuming that all C1*C2 combinations of values of MAKE and MODEL actually occur in the database. As noted above, the reality is that all such combinations will never occur, because models of cars are uniquely named by their makers for competitive reasons.

This information is application-dependent, and hence usually unknown to the optimizer. However, if the optimizer is provided additional statistics giving the exact number C12 of combinations of MAKE and MODEL that actually occur in the database, then it has both an indication that the independence assumption is invalid and a measure of how far off the estimation is because of the assumption. The correction factor to the selectivity S12 for the set of predicates {P1, P2} is then computable as:

$$A12 = C1*C2/C12$$

This adjustment factor will be used in the second phase to adjust the selectivity S12 (and possibly the selectivity of other sets of predicates) to derive more accurate selectivities, and hence more accurate cardinality estimates.

In a similar fashion, the adjustment factors for other sets of predicates that might be correlated can be computed, presuming that statistics are available that give the number of distinct values for combinations of values of columns referenced in those predicates. In the car example, suppose that there are also statistics on the number of combinations of values of columns MAKE, MODEL, STYLE, and YEAR, C1234. As noted above, not all manufacturers built all possible styles in all years, so it should be expected that C1234 would be much smaller than the number of all possible combinations of MAKE, MODEL, STYLE, and YEAR: C1*C2*C3*C4.

For the additional predicates:

P3: STYLE='hatchback'

P4: YEAR=1990

Then, there would be an adjustment factor:

$$A1234 = C1*C2*C3*C4/C1234.$$

In general, the adjustment factor A12 . . . j for a given set of predicates P1, P2, . . . , Pj is computed using selectivities:

$$A12 \ldots j(P1, \ldots, Pj) = S123 \ldots j/S1*S2* \ldots *Sj$$

where Si are individual selectivities and S123 . . . j is a combined selectivity, which can be arrived at via statistics on combined columns (e.g., index statistics) or by some other means.

These adjustment factors can be computed once, for all possible alternative QEPs, and so can be computed before the planning phase begins. They are associated with a unique identifier for a set of predicates, so that, in the planning phase, alternative QEPs can denote which sets of adjustments have been applied thus far, as described below.

Planning Phase

The planning phase incrementally applies, to each alternative QEP, the adjustment factors that were derived in the pre-planning phase, as additional predicates become eligible for application. As alternative QEPs are constructed in the planning phase by adding operators that gain access to additional columns and hence can apply additional predicates, the number of rows on which these operators are operating is reduced by the selectivity of the newly-applied predicates. Furthermore, many alternative QEPs are generated, and the QEPs can involve many operators. Re-deriving the cardinality for each QEP and all operators, each time a new operator was added, would require a large amount of (redundant) computation. For these reasons, it is highly desirable to compute the cardinality incrementally as each operator is added, i.e., using only the net effect of all previous operators in that QEP.

A predicate is not eligible to be applied until the column (s) it references have been fetched into memory by some operator, such as ISCAN or FETCH operator. It is generally assumed, but not a requirement of the present invention, that predicates are in fact applied as soon as they become eligible. However, once the optimizer chooses (for whatever reason) to apply one or more predicates, the effect of those predicates on the estimated number of rows (the cardinality) resulting therefrom must be computed, as the cost of each operation depends very directly on the number of rows processed.

In the prior art, the effect of each predicate on the cardinality is represented as the selectivity, which is the fraction of rows that are expected to satisfy that predicate. This selectivity is multiplied by the number of rows, thereby reducing the number of rows to just the number expected to satisfy the predicate. For example, suppose the cars table had 1,000,000 cars in it, and the selectivities for individual predicates were as follows:

| Predicate | Column | Selectivity |
| --- | --- | --- |
| P1 | MAKE | 0.05 = S1 |
| P2 | MODEL | 0.01 = S2 |
| P3 | STYLE | 0.04 = S3 |
| P4 | YEAR | 0.02 = S4 |

Now, suppose there is an index I1 on just the MAKE column. A QEP that used index I1 to access the cars table would begin with an IXSCAN operator that can apply only predicate P1, since index I1 contains only column MAKE. So, for this partial QEP, after predicate P1 was applied, there would be an estimate to satisfy the query thus far:

0.05*1,000,000=50,000 cars

This number would be important to know to estimate the number of rows for which the corresponding data page must be retrieved, using the subsequent QEP operator, FETCH This operator retrieves the remaining columns of that table that are referenced in the query, making the remaining predicates eligible. As additional predicates become eligible and are applied, their selectivities are multiplied by the current number of rows, to get a new estimate of the number of rows. If, for example, the predicates on MODEL, STYLE, and YEAR became eligible in the FETCH, the existing art would multiply the selectivities for the newly-eligible predicates to the cardinality estimate thus far:

Cardinality=50,000*$S2$*$S3$*$S4$=50,000*0.01*0.04*0.02=0.4 rows

As indicated above, the calculation assumes that each of the predicates is independent, i.e., that all combinations of values of the four columns occur in the database, and therefore severely underestimates the true number of rows satisfying the set of predicates {P1, P2, P3, P4}.

The adjustment factors are used, together with the selectivities, to adjust incremental cardinality estimates. As each operator O that may apply one or more predicates is added to a candidate QEP Q, the optimizer performs the following sequence of steps:

(1) Determine the set N of predicates that will be newly applied by that operator. This is usually the set of newly-eligible predicates, formed by subtracting from the set E of all predicates that are eligible to be applied by operator O or any of its predecessors in QEP Q, by virtue of the columns they reference, the set of predicates applied by previous operators. The cumulative set of predicates that have been applied by or before an operator R is maintained as a property of that operator.

(2) Determine the cardinality estimate C for operator O. This is computed by multiplying the cardinality estimate for the previous operator by the individual selectivity of each predicate n in the set N of newly applied predicates. The cardinality estimate output by the last operator R prior to operator O is maintained as a property of that operator. If operator O has more than one input, then the cardinalities are combined in a way that is dependent upon the type of operator O. For example, a UNION operator adds the cardinalities of its inputs, whereas a JOIN operator multiplies the cardinalities of its inputs.

(3) From the set of all possible adjustments computed in the pre-planning phase, determine the set of adjustments A that are made applicable by the all predicates E that are in N or that were applied already (in the predicate property of R), i.e., the union of the predicates being applied by the new operator and the previously applied predicates.

(4) Determine the cumulative set of adjustments B that have been applied by all operators prior to operator O in this QEP Q. This cumulative set of adjustments applied up to and including an operator R is maintained as a property of each operator R in the QEP. If there is more than one input to operator O, then B is the union of the adjustment properties for all of its input operators.

(5) Determine the set AA of newly eligible adjustments by subtracting set B from set A.

(6) Initialize the adjustments property Y that is output by operator O to be set A.

(7) For each such adjustment a in the set AA,
  (7.1) Remove from set AA and O's adjustment property Y any adjustment k whose predicates are a subset of the predicates of a.
  (7.2) For each adjustment b in B whose predicates are a proper subset of the predicates of a,
    (7.2.1) Divide the cardinality by the adjustment factor for b.
    (7.2.2) Delete adjustment b from O's adjustment property Y.
  (7.3) Multiply the estimated cardinality for O by the adjustment factor for adjustment a.

EXAMPLES

The preferred embodiment of the present invention will now be illustrated for two different QEPs satisfying the example query.

Suppose that the cars table had two indexes defined on it:

| Index Name | Columns |
| --- | --- |
| I1 | MAKE |
| I2 | MAKE, MODEL |

Suppose further that there were the following statistics of distinct values for the following sets of columns:

| Column(s) | Set name | # of Distinct Values |
| --- | --- | --- |
| MAKE | C1 | 20 |
| MODEL | C2 | 100 |
| STYLE | C3 | 25 |
| YEAR | C4 | 50 |
| MAKE, MODEL | C12 | 100 |
| MAKE, MODEL, STYLE, YEAR | C1234 | 800 |

From these statistics, the preferred embodiment of the present invention will determine the following adjustment factors, which are identified by the set of predicates that must have been applied in order for that adjustment to be applied:

| Adjustment factor | Predicates | Value |
| --- | --- | --- |
| A12 | P1, P2 | C1 * C2/C12 = 2000/100 = 20 |
| A1234 | P1, P2, P3, P4 | C1 * C2 * C3 * C4/C1234 = 2500000/800 = 3125 |

QEP1: Index I1

QEP1 uses an IXSCAN on Index I1, extracting column MAKE and applying predicate P1, followed by a FETCH to table cars to get the remaining columns and apply the remaining predicates P2, P3, P4.

For the IXSCAN, the sequence is as follows:
(1) Only P1 is eligible to be applied.
(2) The cardinality estimate C=(# of cars)*S1=50,000 is computed.
(3) None of the adjustments are applicable at this point, because only column C1 (MAKE) is in the index.
(4) There are no previous operators, so this step has nothing to do and B is empty.
(5) AA is empty as well.
(6) A is empty, so the adjustment property output by IXSCAN is therefore empty.
(7) AA is empty, so there is nothing to do.

For the FETCH operator following the IXSCAN, the steps are as follows:
(1) Predicates E={P1, P2, P3, P4} are eligible, of which N={P2, P3, P4} newly-eligible to be applied.
(2) The cardinality estimate C=50,000*$S2$*$S3$*$S4$=0.4 is computed.
(3) Both adjustments A12 and A1234 are newly applicable, because all predicates in A12 and A1234 are subsumed by E, so A={A12, A1234}.

(4) The adjustment property output by IXSCAN is empty, so B is empty.
(5) B is empty, so AA is identical to A.
(6) Initialize the adjustment property output by FETCH, Y=A={A12, A1234}.
(7) Perform the following steps (7.1)–(7.3):
   (7.1) Adjustment A12 is subsumed by A1234, so the adjustment for A12 can be eliminated from both AA and the adjustment property output by FETCH.
   (7.2) No previous adjustments were eligible or applied.
   (7.3) The cardinality O output by FETCH is multiplied by adjustment A1234: C=0.4*3125=1250

QEP2: Index I2

QEP2 uses an IXSCAN on Index I2, extracting columns MAKE and MODEL and applying predicates P1 and P2, followed by a FETCH to get the remaining columns and apply the remaining predicates P3 and P4.

For the IXSCAN, the sequence is as follows:
(1) Predicates E={P1, P2} are eligible to be applied.
(2) The cardinality estimate C=(# of cars)*S1*S2=500 is computed.
(3) Only adjustment A12 is applicable at this point, because its predicates {P1, P2} are subsumed by E, so A={A12}.
(4) There are no previous operators, so this step has nothing to do and B is empty.
(5) B is empty, so AA is identical to A
(6) The adjustment property output by IXSCAN equals the set A={A12}.
(7) Perform the following steps (7.1)–(7.3):
   (7.1) There is only one adjustment, so there is nothing to do here.
   (7.2) B is empty, so there is nothing to do here.
   (7.3) Multiply cardinality C output by IXSCAN by the adjustment for A12: C=500*20=10,000.

For the FETCH operator following the IXSCAN, the steps are as follows:
(1) Predicates E={P1, P2, P3, P4} are eligible, of which N={P3, P4} are newly eligible to be applied.
(2) The cardinality estimate C=10,000*S3*S4=8 is computed.
(3) Adjustment A1234 is newly applicable, because its predicate set {P1, P2, P3, P4} is subsumed by E, so A={A12, A1234}.
(4) The adjustment property output by IXSCAN is {A12}=B.
(5) Set AA={A12, A1234}−{A12}={A1234}.
(6) Initialize the adjustment property output by FETCH, Y=A={A12, A1234}.
(7) Perform the following steps (7.1)–(7.3):
   (7.1) AA has only one element, so there is nothing to do here.
   (7.2) A12 is subsumed by A1234, so it must be removed from the cardinality computed thus far and from the adjustment property Y, so C=8/20=0.4.
   (7.3) The cardinality C output by FETCH is multiplied by adjustment A1234: C=0.4*3125=1250.

It is important to note that the cardinality estimate for both QEPs is identical (1250), as it should be for two QEPs that produce equivalent results. This is a critical attribute of any such incremental technique for estimating cardinalities.

Logic of the Preferred Embodiment

Figure 6:
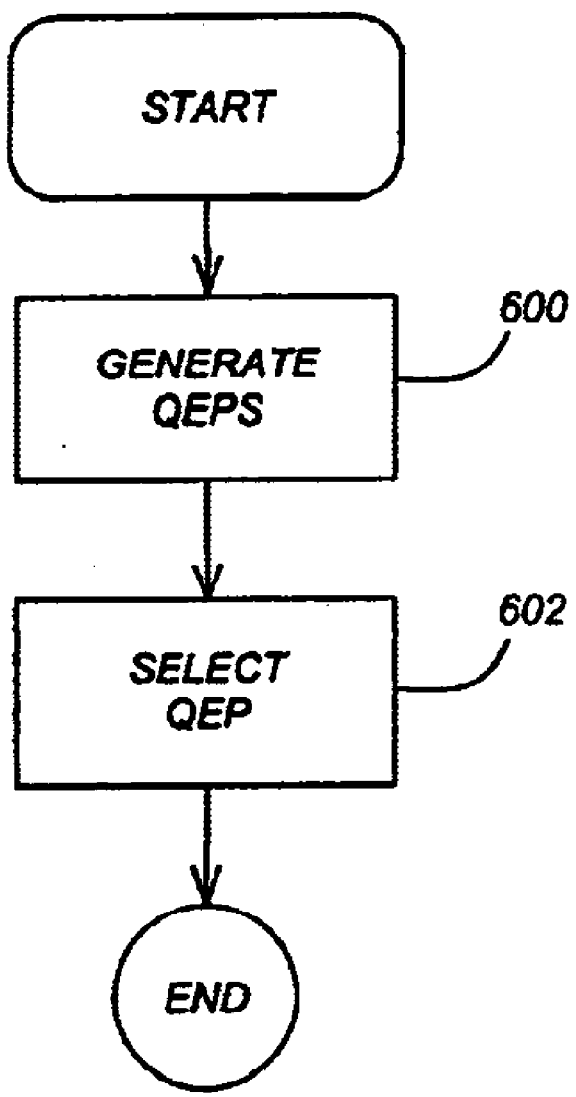
FIG. 6 is a flowchart that illustrates the logic performed according to the preferred embodiment of the present invention.

FIG. 6 is a flowchart illustrating the logic of optimizing SQL queries in step 204 of FIG. 2 and step 312 of FIG. 3 according to the preferred embodiment of the present invention.

Block 600 represents the RDBMS generating a plurality of query execution plans (QEPs) for the query, including computing a cardinality for any of the QEPs in which two or more predicates are correlated to each other, wherein the cardinality is computed in an incremental fashion for each operator of the QEP and comprises a number of rows expected to be returned by the QEP. These computations are comprised of calculations that may be done prior to the generation of the QEPs and calculations that are necessarily done as each operator of a QEP is added to that QEP. This logic is further described in FIG. 7.

Block 602 represents the RDBMS choosing one of the QEPs for satisfying the query, typically to minimize some estimated cost metric, such as resource consumption or elapsed time, wherein the most important factor in accurately computing any cost metric is the cardinality estimate.

Figure 7:
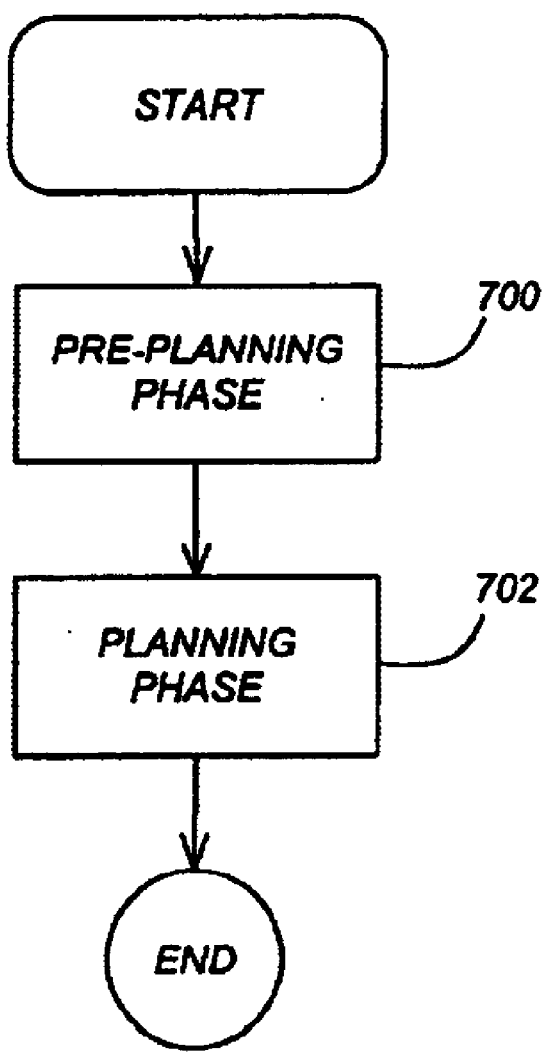
FIG. 7 is a flowchart that illustrates the logic performed in computing a cardinality for any of the query execution plans in which predicates are correlated, according to the preferred embodiment of the present invention.

FIG. 7 is a flowchart that illustrates the logic performed in computing a cardinality for any of the QEPs in which predicates are correlated, according to the preferred embodiment of the present invention.

Block 700 represents the RDBMS performing a pre-planning phase for the query to compute a selectivity for each predicate in a WHERE clause of the query, wherein an adjustment factor to the selectivities is calculated for the predicates which may be correlated to each other. This Block includes the steps of determining all subsets of predicates in the QEP that are correlated and their true combined selectivities, and then computing, for each of the determined subsets of predicates in the QEP, an adjustment factor for a corresponding set of predicates referencing the determined subset, wherein the adjustment factor is a ratio of the true combined selectivities of the determined subset of predicates and a product of individual selectivities of the corresponding set of predicates as computed under an independence assumption.

One approach to determining the true combined selectivity of a set of predicates, which is necessary for computing the adjustment factor, employs a statistic comprising a number of combined distinct values occurring in the database for columns referenced in any set of predicates which are correlated. The statistic may already exist prior to the query, due to the creation of an index and the collection of statistics on that index, or the statistic may be provided by the user.

The most general way of computing an adjustment factor A12 . . . j for a given set of predicates P1, P2, . . . , Pj is via selectivities:

$$A12\ldots j(P1,\ldots,Pj)=S123\ldots j/S1^*S2^*\ldots\,^*Sj$$

wherein Si are individual selectivities and S123 . . . j is a combined selectivity, which can be arrived at via statistics on combined columns (e.g., index statistics) or by other means.

The adjustment factors are computed once for all possible QEPs, and so can be computed before the planning phase is performed. Thereafter, the adjustment factors are associated with a unique identifier for a set of predicates, so that, in the planning phase, the QEPs can denote which sets of adjustment factors have been applied thus far.

Block 702 represents the RDBMS performing a planning phase for the query as the plurality of QEPs are generated for the query, wherein the adjustment factors are incrementally applied to each QEP as additional predicates become eligible for application, so that as QEPs are constructed by adding operators that gain access to additional columns and hence apply additional predicates, a number of rows on which these operators are operating is reduced by the selectivity of the newly-applied predicates, and the cardinality is computed incrementally as each operator is added using only a net effect of all previous operators in that QEP. This logic is further described in FIGS. 8A and 8B.

A predicate is not eligible to be applied until columns it references have been fetched into memory by an operator. In one embodiment, a predicate is applied as soon as it becomes eligible, although other embodiments may use different strategies.

The cardinality is computed when one or more predicates are applied, wherein the cardinality comprises an estimated number of rows resulting from the predicates. The adjustment factors are used, together with the selectivities, to adjust incremental cardinality estimates.

Figure 8A:
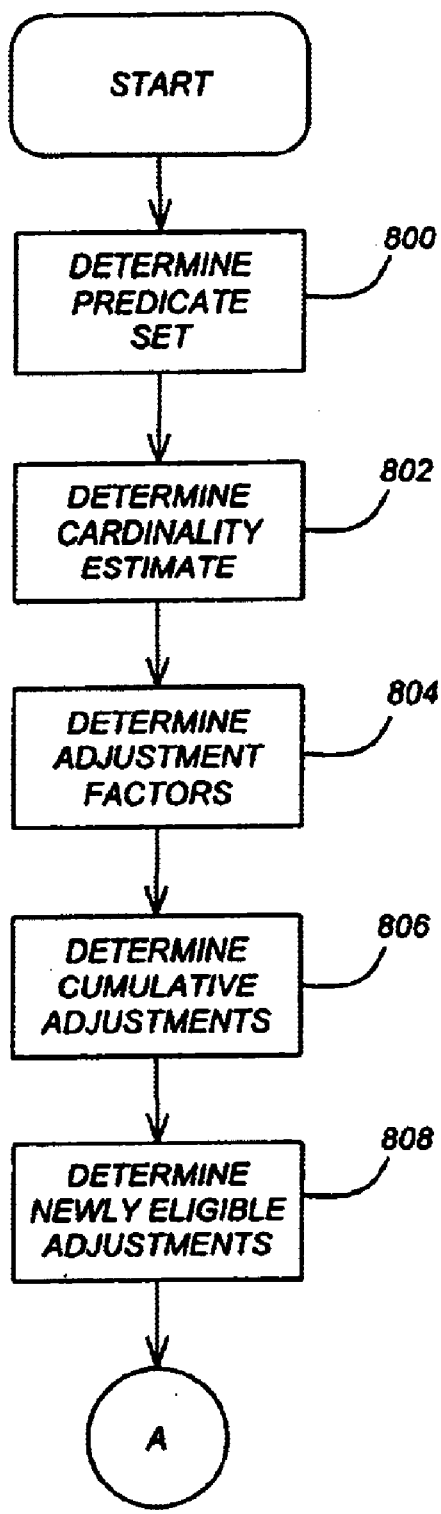
FIGS. 8A and 8B together are a flowchart that illustrates the logic performed in the planning phase as each operator that may apply one or more predicates is added to a candidate query execution plan, according to the preferred embodiment of the present invention.
Figure 8B:
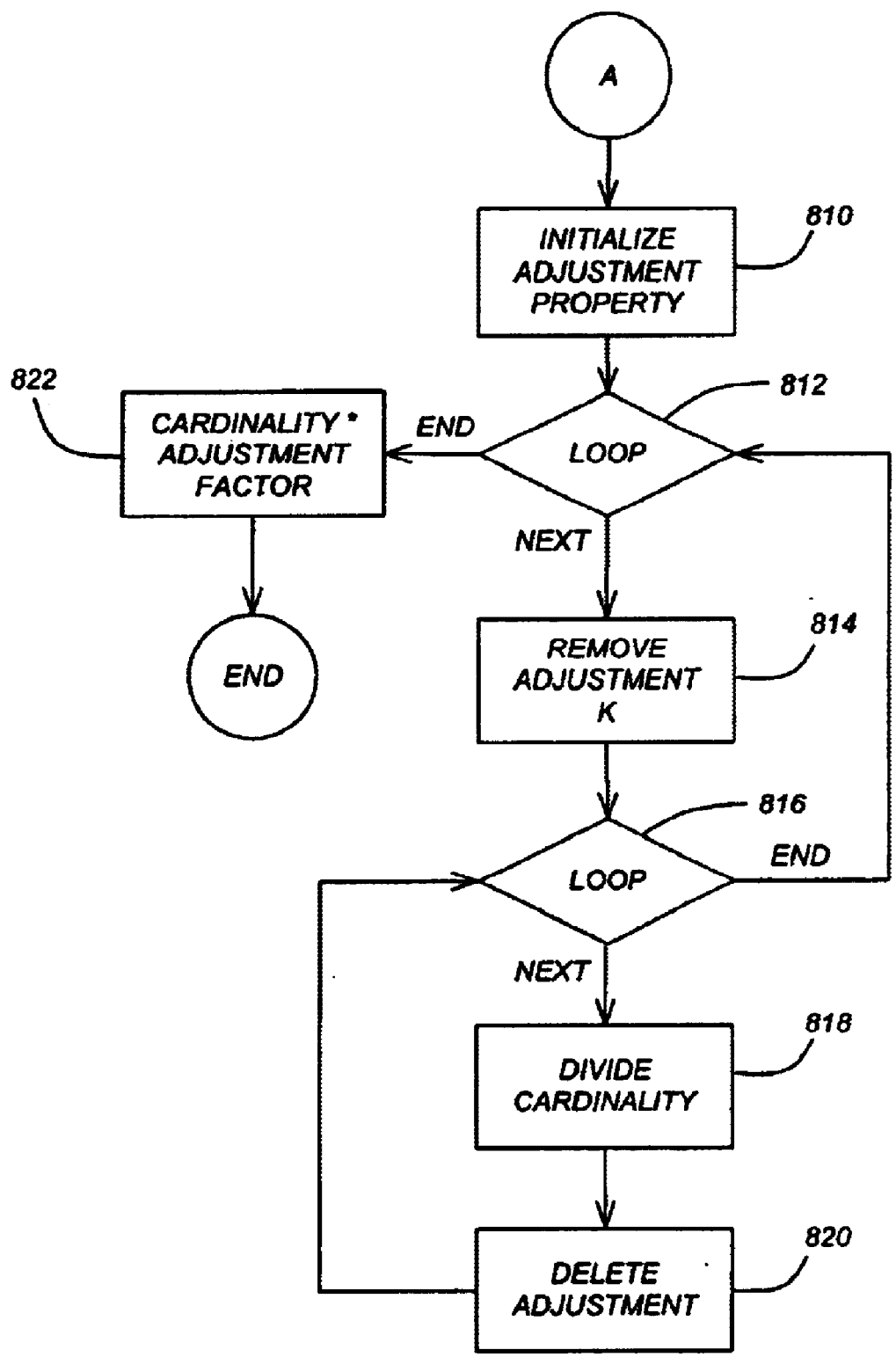

FIGS. 8A and 8B together are a flowchart that illustrates the logic performed in the planning phase as each operator O that may apply one or more predicates is added to a candidate QEP Q, according to the preferred embodiment of the present invention.

Block 800 represents the RDBMS determining a set N of predicates that will be newly applied by that operator. The set N of predicates is the set of newly-eligible predicates formed by subtracting from a set E of all predicates that are eligible to be applied by operator O or any of its predecessors in QEP Q, by virtue of the columns they reference, the set of predicates applied by previous operators.

Block 802 represents the RDBMS determining a cardinality estimate C for the operator O. The cumulative set of predicates that have been applied by or before an operator R is maintained as a property of that operator. The cardinality estimate C for operator O is computed by multiplying the cardinality estimate for a previous operator by the individual selectivity of each predicate n in the set N of newly-applied predicates. The cardinality estimate C output by a last operator R prior to operator O is maintained as a property of the operator R. If operator O has more than one input, then the cardinalities are combined in a way that is dependent upon a type of operator O.

Block 804 represents the RDBMS, from a set of all possible adjustment factors computed in the pre-planning phase, determining a set of adjustment factors A that are made applicable by the predicates E that are in N and that were applied already (in the predicate property of R), i.e., the union of the predicates being applied by the new operator and the previously applied predicates.

Block 806 represents the RDBMS determining a cumulative set of adjustments B that have been applied by all operators prior to operator O in the QEP Q. The cumulative set of adjustments B applied up to and including an operator R is maintained as a property of each operator R in the QEP. If there is more than one input to operator O, then the cumulative set of adjustments B is the union of the adjustment properties for all of its input operators.

Block 808 represents the RDBMS determining a set AA of newly eligible adjustments by subtracting set B from set A.

Block 810 represents the RDBMS initializing an adjustment property Y that is output by operator O to be set A.

Block 812 is a loop that represents the RDBMS performing Blocks 814–820 for each such adjustment a in the set AA. Upon completion of the loop, control transfers to Block 822.

Block 814 represents the RDBMS removing from set AA and O's adjustment property Y any adjustment k whose predicates are a subset of the predicates of a.

Block 816 is a loop that represents the RDBMS performing Blocks 818–820 for each adjustment b in B whose predicates are a proper subset of the predicates of a. Upon completion of the loop, control transfers to Block 812.

Block 818 represents the RDBMS dividing the cardinality by the adjustment factor for b.

Block 820 represents the RDBMS deleting the adjustment b from O's adjustment property Y.

Block 822 represents the RDBMS multiplying the estimated cardinality for O by the adjustment factor for adjustment a. Thereafter, the logic terminates.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any database management system could benefit from the present invention.

In summary, the present invention discloses a method, apparatus, and article of manufacture for incrementally estimating the cardinality of a derived relation when statistically correlated predicates are applied. A plurality of query execution plans (QEPs) are generated for the query. During the generation of the QEPs, a cardinality is computed for any of the QEPs in which two or more predicates are correlated to each other. The cardinality comprises a number of rows expected to be returned by the QEP and is computed in an incremental fashion for each operator of the QEP. The computations include calculations that may be done prior to the generation of the QEPs and calculations that are necessarily done as each operator of a QEP is added to that QEP. Thereafter, one of the QEPs is chosen to satisfy the query in a manner that minimizes an estimated cost metric, wherein the cost metric is computed using the cardinality.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of performing a query in a computer system to retrieve data from a database stored on the computer system, the method comprising:

(a) generating a plurality of query execution plans (QEPs) for the query, including computing a cardinality for any of the QEPs in which two or more predicates are correlated to each other, wherein the cardinality is computed in an incremental fashion for each operator of the QEP assuming independence of all predicates and the cardinality is adjusted for the predicates that are correlated to each other; and (b) choosing one of the QEPs to minimize an estimated cost metric computed using the cardinality.

2. The method of claim 1, wherein the computing step is comprised of calculations that may be done prior to the generation of the QEPs and calculations that are necessarily done as each operator of a QEP is added to that QEP.

3. The method of claim 1, wherein the computing step comprises:

(i) determining all subsets of predicates in the QEP that are correlated and their true combined selectivities; and (ii) for each of the determined subsets of predicates in the QEP, computing an adjustment factor for a corresponding set of predicates referencing the determined subset, wherein the adjustment factor is a ratio of the true combined selectivities of the determined subset of predicates and a product of individual selectivities of the corresponding set of predicates as computed under an independence assumption.

4. The method of claim 3, wherein the computing step comprises:

performing a pre-planning phase for the query to compute a selectivity for each predicate in a WHERE clause of the query, wherein an adjustment factor to the selectivities is calculated for the predicates which may be correlated to each other; and performing a planning phase for the query as the plurality of QEPs are generated for the query, wherein the adjustment factors are incrementally applied to each QEP as additional predicates become eligible for application, so that as QEPs are constructed by adding operators that gain access to additional columns and hence apply additional predicates, a number of rows on which these operators are operating is reduced by the selectivity of the newly-applied predicates, and the cardinality is computed incrementally as each operator is added using only a net effect of all previous operators in that QEP.

5. The method of claim 4, wherein the adjustment factor is computed from one or more statistics.

6. The method of claim 5, wherein the statistics comprise a number of combined distinct values occurring in the database for columns referenced in any set of predicates that are correlated.

7. The method of claim 5, wherein the statistics already exist prior to the query, due to the creation of an index and the collection of statistics on that index.

8. The method of claim 5, wherein the statistics are provided by the user.

9. The method of claim 4, further comprising computing the adjustment factor A12 . . . j for a given set of predicates P1, P2, . . . , Pj using selectivities:

$$A12\ldots j(P1,\ldots,Pj)=S123\ldots j/S1*S2*\ldots *Sj$$

where Si are individual selectivities and S123 . . . j is a combined selectivity.

10. The method of claim 4, the selectivities can be determined using statistics on one or more columns.

11. The method of claim 4, wherein the adjustment factors are computed once for all possible QEPs, and so can be computed before the planning phase is performed.

12. The method of claim 4, wherein the adjustment factors are associated with a unique identifier for a set of predicates, so that, in the planning phase, the QEPs can denote which sets of adjustment factors have been applied thus far.

13. The method of claim 4, further comprising computing the cardinality when one or mote predicates are applied, wherein the cardinality comprises an estimated number of rows resulting from the predicates.

14. The method of claim 13, wherein the adjustment factors are used, together with the selectivities, to adjust incremental cardinality estimates.

15. The method of claim 4, wherein, as each operator O that may apply one or more predicates is added to a candidate QEP Q, the planning phase comprises:

(1) determining a set N of predicates that will be newly applied by that operator;

(2) determining a cardinality estimate C for the operator O;

(3) from a set of all possible adjustment factors computed in the pre-planning phase, determining the set of adjustment factors A that are made applicable by the predicates E that are in N and that were previously applied;

(4) determining a cumulative set of adjustments B that have been applied by all operators prior to operator O in the QEP Q;

(5) determining a set AA of newly eligible adjustments by subtracting set B from set A;

(6) initializing the adjustment property Y that is output by operator O to be set A;

(7) for each such adjustment a in the set AA:

(7.1) removing from set AA and O's adjustment property Y any adjustment k whose predicates are a subset of the predicates of a;

(7.2) for each adjustment b in B whose predicates are a proper subset of the predicates of a:

(7.2.1) dividing the cardinality by the adjustment factor for b; and (7.2.2) deleting the adjustment b from O's adjustment property Y; and (7.3) multiplying the estimated cardinality for O by the adjustment factor for adjustment a.

16. The method of claim 15, wherein the set N of predicates is the set of newly-eligible predicates formed by subtracting from the set E of all predicates that are eligible to be applied by operator O or any of its predecessors in QEP Q, by virtue of the columns they reference, the set of predicates applied by previous operators.

17. The method of claim 15, wherein the cumulative set of predicates that have been applied by or before an operator R is maintained as a property of that operator.

18. The method of claim 15, wherein the cardinality estimate C for operator O is computed by multiplying the cardinality estimate for a previous operator by the individual selectivity of each predicate n in the set N of newly-applied predicates.

19. The method of claim 15, wherein the cardinality estimate C output by a last operator R prior to operator O is maintained as a property of the operator R.

20. The method of claim 15, wherein, if operator O has more than one input, then the cardinalities are combined in a way that is dependent upon a type of operator O.

21. The method of claim 15, wherein the cumulative set of adjustments B applied up to and including an operator R is maintained as a property of each operator R in the QEP.

22. The method of claim 15, wherein, if there is more than one input to operator O, then the cumulative set of adjustments B is the union of the adjustment properties for all of its input operators.

23. A computer-implemented apparatus for performing a query, comprising:

(a) a computer system, wherein the query is performed by the computer system to retrieve data from a database stored on the computer system;

(b) logic, performed by the computer system, for:

(1) generating a plurality of query execution plans (QEPs) for the query, including computing a cardinality for any of the QEPs in which two or more predicates are correlated to each other, wherein the cardinality is computed in an incremental fashion for each operator of the QEP assuming independence of all predicates and the cardinality is adjusted for the predicates that are correlated to each other; and (2) choosing one of the QEPs to minimize an estimated cost metric computed using the cardinality.

24. The apparatus of claim 23, wherein the logic for computing is comprised of calculations that may be done prior to the generation of the QEPs and calculations that are necessarily done as each operator of a QEP is added to that QEP.

25. The apparatus of claim 23, wherein the logic for computing comprises logic for:
(i) determining all subsets of predicates in the QEP that are correlated and their true combined selectivities; and
(ii) for each of the determined subsets of predicates in the QEP, computing an adjustment factor for a corresponding set of predicates referencing the determined subset, wherein the adjustment factor is a ratio of the true combined selectivities of the determined subset of predicates and a product of individual selectivities of the corresponding set of predicates as computed under an independence assumption.

26. The apparatus of claim 25, wherein the logic for computing comprises logic for:
performing a pre-planning phase for the query to compute a selectivity for each predicate in a WHERE clause of the query, where an adjustment factor to the selectivities is calculated for the predicates which may be correlated to each other; and
performing a planning phase for the query as the plurality of QEPs are generated for the query, wherein the adjustment factors are incrementally applied to each QEP as additional predicates become eligible for application, so that as QEPs are constructed by adding operators that gain access to additional columns and hence apply additional predicates, a number of rows on which these operators are operating is reduced by the selectivity of the newly-applied predicates, and the cardinality is computed incrementally as each operator is added using only a net effect of all previous operators in that QEP.

27. The apparatus of claim 26, wherein the adjustment factor is computed from one or more statistics.

28. The apparatus of claim 27, wherein the statistics comprise a number of combined distinct values occurring in the database for columns referenced in any set of predicates that are correlated.

29. The apparatus of claim 27, wherein the statistics already exist prior to the query, due to the creation of an index and the collection of statistics on that index.

30. The apparatus of claim 27, wherein the statistics are provided by the user.

31. The apparatus of claim 26, further comprising logic for computing the adjustment factor $A12 \ldots j$ for a given set of predicates P1, P2, ..., Pj using selectivities:

$$A12 \ldots j(P1, \ldots, Pj) = S123 \ldots j/S1*S2* \ldots *Sj$$

where $Si$ are individual selectivities and $S123 \ldots j$ is a combined selectivity.

32. The apparatus of claim 26, the selectivities can be determined using statistics on one or more columns.

33. The apparatus of claim 26, wherein the adjustment factors are computed once for all possible QEPs, and so can be computed before the planning phase is performed.

34. The apparatus of claim 26, wherein the adjustment factors are associated with a unique identifier for a set of predicates, so that, in the planning phase, the QEPs can denote which sets of adjustment factors have been applied thus far.

35. The apparatus of claim 26, further comprising computing the cardinality when one or more predicates are applied, wherein the cardinality comprises an estimated number of rows resulting from the predicates.

36. The apparatus of claim 35, wherein the adjustment factors are used, together with the selectivities, to adjust incremental cardinality estimates.

37. The apparatus of claim 26, wherein, as each operator O that may apply one or more predicates is added to a candidate QEP Q, the planning phase comprises logic for:
(1) determining a set N of predicates that will be newly applied by that operator;
(2) determining a cardinality estimate C for the operator O;
(3) from a set of all possible adjustment factors computed in the pre-planning phase, determining the set of adjustment factors A that are made applicable by the predicates E that are in N and that were previously applied;
(4) determining a cumulative set of adjustments B that have been applied by all operators prior to operator O in the QEP Q;
(5) determining a set AA of newly eligible adjustments by subtracting set B from set A;
(6) initializing the adjustment property Y that is output by operator O to be set A;
(7) for each such adjustment a in the set AA:
(7.1) removing from set AA and O's adjustment property Y any adjustment k whose predicates are a subset of the predicates of a;
(7.2) for each adjustment b in B whose predicates are a proper subset of the predicates of a:
(7.2.1) dividing the cardinality by the adjustment factor for b; and
(7.2.2) deleting the adjustment b from O's adjustment property Y; and
(7.3) multiplying the estimated cardinality for O by the adjustment factor for adjustment a.

38. The apparatus of claim 37, wherein the set N of predicates is the set of newly-eligible predicates formed by subtracting from the set E of all predicates that are eligible to be applied by operator O or any of its predecessors in QEP Q, by virtue of the columns they reference, the set of predicates applied by previous operators.

39. The apparatus of claim 37, wherein the cumulative set of predicates that have been applied by or before an operator R is maintained as a property of that operator.

40. The apparatus of claim 37, wherein the cardinality estimate C for operator O is computed by multiplying the cardinality estimate for a previous operator by the individual selectivity of each predicate n in the set N of newly-applied predicates.

41. The apparatus of claim 37, wherein the cardinality estimate C output by a last operator R prior to operator O is maintained as a property of the operator R.

42. The apparatus of claim 37, wherein, if operator O has more than one input, then the cardinalities are combined in a way that is dependent upon a type of operator O.

43. The apparatus of claim 37, wherein the cumulative set of adjustments B applied up to and including an operator R is maintained as a property of each operator R in the QEP.

44. The apparatus of claim 37, wherein, if there is more than one input to operator O, then the cumulative set of adjustments B is the union of the adjustment properties for all of its input operators.

45. An article of manufacture embodying logic for performing a query in a computer system to retrieve data from a database stored in a data storage device coupled to the computer system, the logic comprising:

(a) generating a plurality of query execution plans (QEPs) for the query, including computing a cardinality for any of the QEPs in which two or more predicates are correlated to each other, wherein the cardinality is computed in an incremental fashion for each operator of the QEP assuming independence of all predicates and the cardinality is adjusted for the predicates that are correlated to each other; and (b) choosing one of the QEPs to minimize an estimated cost metric computed using the cardinality.

46. The article of manufacture of claim 45, wherein the logic for computing is comprised of calculations that may be done prior to the generation of the QEPs and calculations that are necessarily done as each operator of a QEP is added to that QEP.

47. The article of manufacture of claim 45, wherein the logic for computing comprises logic for:

(i) determining all subsets of predicates in the QEP that we correlated and their true combined selectivities; and (ii) for each of the determined subsets of predicates in the QEP, computing an adjustment factor for a corresponding set of predicates referencing the determined subset, wherein the adjustment factor is a ratio of the true combined selectivities of the determined subset of predicates and a product of individual selectivities of the corresponding set of predicates as computed under an independence assumption.

48. The article of manufacture of claim 47, wherein the logic for computing comprises logic for:

performing a pre-planning phase for the query to compute a selectivity for each predicate in a WHERE clause of the query, wherein an adjustment factor to the selectivities is calculated for the predicates which may be correlated to each other; and performing a planning phase for the query as the plurality of QEPs are generated for the query, wherein the adjustment factors are incrementally applied to each QEP as additional predicates become eligible for application, so that as QEPs are constructed by adding operators that gain access to additional columns and hence apply additional predicates, a number of rows on which these operators are operating is seduced by the selectivity of the newly-applied predicates, and the cardinality is computed incrementally as each operator is added using only a net effect of all previous operators in that QEP.

49. The article of manufacture of claim 48, wherein the adjustment factor is computed from one or more statistics.

50. The article of manufacture of claim 49, wherein the statistics comprise a number of combined distinct values occurring in the database for columns referenced in any set of predicates that are correlated.

51. The article of manufacture of claim 49, wherein the statistics already exist prior to the query, due to the creation of an index and the collection of statistics on that index.

52. The article of manufacture of claim 49, wherein the statistics are provided by the user.

53. The article of manufacture of claim 48, further comprising logic for computing the adjustment factor $A12\ldots j$ for a given set of predicates P1, P2, ..., Pj using selectivities:

$$A12\ldots j(P1, \ldots, Pj) = S123\ldots j/S1*S2\ldots *Sj$$

where Si are individual selectivities and $S123\ldots j$ is a combined selectivity.

54. The article of manufacture of claim 48, the selectivities can be determined using statistics on one or more columns.

55. The article of manufacture of claim 48, wherein the adjustment factors are computed once for all possible QEPs, and so can be computed before the planing phase is performed.

56. The article of manufacture of claim 48, wherein the adjustment factors are associated with a unique identifier for a set of predicates, so that, in the planing phase, the QEPs can denote which sets of adjustment factors have been applied thus far.

57. The article of manufacture of claim 48, further comprising logic for computing the cardinality when one or more predicates are applied, wherein the cardinality comprises an estimated number of rows resulting from the predicates.

58. The article of manufacture of claim 57, wherein the adjustment factors are used, together with the selectivities, to adjust incremental cardinality estimates.

59. The article of manufacture of claim 48, wherein, as each operator O that may apply one or more predicates is added to a candidate QEP Q, the planning phase comprises logic for:

(1) determining a set N of predicates that will be newly applied by that operator;

(2) determining a cardinality estimate C for the operator O;

(3) from a set of all possible adjustment factors computed in the pre-planning phase, determining the set of adjustment factors A that are made applicable by the predicates E that are in N and that were previously applied;

(4) determining a cumulative set of adjustments B that have been applied by all operators prior to operator O in the QEP Q;

(5) determining a set AA of newly eligible adjustments by subtracting set B from set A;

(6) initializing the adjustment property Y that is output by operator O to be set A;

(7) for each such adjustment a in the set AA:

(7.1) removing from set AA and O's adjustment property Y any adjustment k whose predicates are a subset of the predicates of a;

(7.2) for each adjustment b in B whose predicates are a proper subset of the predicates of a:

(7.2.1) dividing the cardinality by the adjustment factor for b; and (7.2.2) deleting the adjustment b from O's adjustment property Y; and (7.3) multiplying the estimated cardinality for O by the adjustment factor for adjustment a.

60. The article of manufacture of claim 59, wherein the set N of predicates is the set of newly-eligible predicates formed by subtracting from the set E of all predicates that are eligible to be applied by operator O or any of its predecessors in QEP Q, by virtue of the columns they reference, the set of predicates applied by previous operators.

61. The article of manufacture of claim 59, wherein the cumulative set of predicates that have been applied by or before an operator R is maintained as a property of that operator.

62. The article of manufacture of claim 59, wherein the cardinality estimate C for operator O is computed by multiplying the cardinality estimate for a previous operator by the individual selectivity of each predicate n in the set N of newly-applied predicates.

63. The article of manufacture of claim 59, wherein the cardinality estimate C output by a last operator R prior to operator O is maintained as a property of the operator R.

64. The article of manufacture of claim 59, wherein, if operator O has more than one input, then the cardinalities are combined in a way that is dependent upon a type of operator O.

65. The article of manufacture of claim 59, wherein the cumulative set of adjustments B applied up to and including an operator R is maintained as a property of each operator R in the QEP.

66. The article of manufacture of claim 59, wherein, if there is more than one input to operator O, then the cumulative set of adjustments B is the union of the adjustment properties for all of its input operators.

* * * * *

UNITED STATES PATENT AND TRADEMARK OFFICE
CERTIFICATE OF CORRECTION

PATENT NO. : 6,738,755 B1 Page 1 of 1
DATED : May 18, 2004
INVENTOR(S) : Johann Christoph Freytag et al.

It is certified that error appears in the above-identified patent and that said Letters Patent is hereby corrected as shown below:

<u>Title page,</u>
Item [56], References Cited, FOREIGN PATENT DOCUMENTS, insert

-- EP 0 875 838 A2  11/1998  G06F 17/30 --.

<u>Column 17,</u>
Line 55, "mote" should read -- more --.

<u>Column 21,</u>
Line 19, "we" should read -- are --.
Line 42, "seduced" should read -- reduced --.

Signed and Sealed this

Twenty-eighth Day of September, 2004

JON W. DUDAS
*Director of the United States Patent and Trademark Office*